United States Patent [19]

Sisbarro

[11] Patent Number: 4,624,810

[45] Date of Patent: Nov. 25, 1986

[54] PRODUCTION OF A SOLID STICK IN A CONTAINER

[75] Inventor: Frederick P. Sisbarro, Wayne, N.J.

[73] Assignee: Carter-Wallace, Inc., New York, N.Y.

[21] Appl. No.: 645,292

[22] Filed: Aug. 29, 1984

Related U.S. Application Data

[62] Division of Ser. No. 424,317, Sep. 27, 1982, abandoned.

[51] Int. Cl.⁴ .............................................. B29C 59/16

[52] U.S. Cl. ....................................... 264/25; 264/37; 264/80; 264/234; 264/237; 264/296; 264/330; 264/345; 264/348; 425/174.4

[58] Field of Search ............... 264/345, 234, 235, 346, 264/80, 330, 296, 320, 237, 348, 37, 25; 425/174.4

[56] References Cited

U.S. PATENT DOCUMENTS

| | | | |
|---|---|---|---|
| 2,192,675 | 3/1940 | Ferentzy | 264/234 |
| 2,495,597 | 1/1950 | Napier | 264/234 |
| 2,848,821 | 8/1958 | Clark et al. | 34/66 |
| 3,059,275 | 10/1962 | Vogt | 264/102 |
| 3,313,534 | 4/1967 | Frans | 432/78 |
| 3,317,642 | 5/1967 | Bailey | 264/234 |
| 3,479,429 | 11/1969 | Morshauser et al. | 264/75 |
| 3,723,593 | 3/1973 | Ono | 264/66 |
| 3,752,873 | 8/1973 | Lewis, Jr. | 264/346 |
| 4,172,113 | 10/1979 | Featherstone et al. | 264/345 |
| 4,358,899 | 11/1982 | Murch et al. | 34/233 |

*Primary Examiner*—Jeffery Thurlow

*Attorney, Agent, or Firm*—Elliot M. Olstein; John N. Bain

[57] ABSTRACT

A solid stick composition, in a container, is moved through a protective tunnel wherein the stick is cooled to effect solidification, remelted to fill any void in the stick, cooled to solidify, and polished, by heating and cooling, with filtered air flowing through the tunnel to remove heat therefrom.

4 Claims, 2 Drawing Figures

PRODUCTION OF A SOLID STICK IN A CONTAINER

This is a division of application Ser. No. 424,317, filed Sept. 27, 1982, now abandoned.

This invention relates to the production of a solid stick in a container.

In producing a solid stick in a container, such as a solid deodorant or anti-perspirant stick, the production involves filling of the container with the solid stick formulation or composition in liquid form, followed by solidification of the formulation. After the initial solidification, the stick may include an interior void, as a result of differential cooling in the container, and therefore, the stick is subjected to controlled remelting and solidification to eliminate such void. The solid stick may then be subjected to a polishing operation to improve the appearance thereof, with the polishing operation involving one or more heating and cooling steps to sequentially wet, and resolidify the surface of the stick.

In accordance with the present invention, there is provided an improved apparatus or system, and process for producing a solid stick in a container.

In accordance with one aspect of the present invention, there is provided an apparatus or system for finishing a solid stick composition or formulation in a container, which apparatus or system includes a protective tunnel; a carrier means in the tunnel for moving a container including a solid stick composition or formulation through the tunnel; air inlet means for introducing air into the tunnel; air outlet means for withdrawing air from the tunnel; air moving means for moving air through the tunnel between the air inlet means and the air outlet means; and at least two heating stations in the tunnel for heating the solid stick composition in the container.

The heating stations are spaced within the tunnel in a manner such that the stick composition is solidified prior to the heating station.

In accordance with another aspect of the present invention, a solid stick composition or formulation in a container is moved through a protective tunnel, and in the tunnel, the stick composition, in the moving container, is sequentially cooled to solidify the stick; remelted to fill any void in the solid stick; cooled to solidify the stick, and polished by heating and cooling the solid stick composition in the container at least once, with air being passed through the tunnel to provide a controlled environment in the tunnel.

More particularly, a container for a solid stick, such as an anti-perspirant or deodorant stick is filled with the solid stick composition, in liquid form. The container including the solid stick formulation is introduced into the protective tunnel, with the stick formulation being either in liquid or partially solidified form. In the protective tunnel, as hereinabove described, the stick is solidified, remelted to fill any void therein, solidified and polished.

Figure 1:
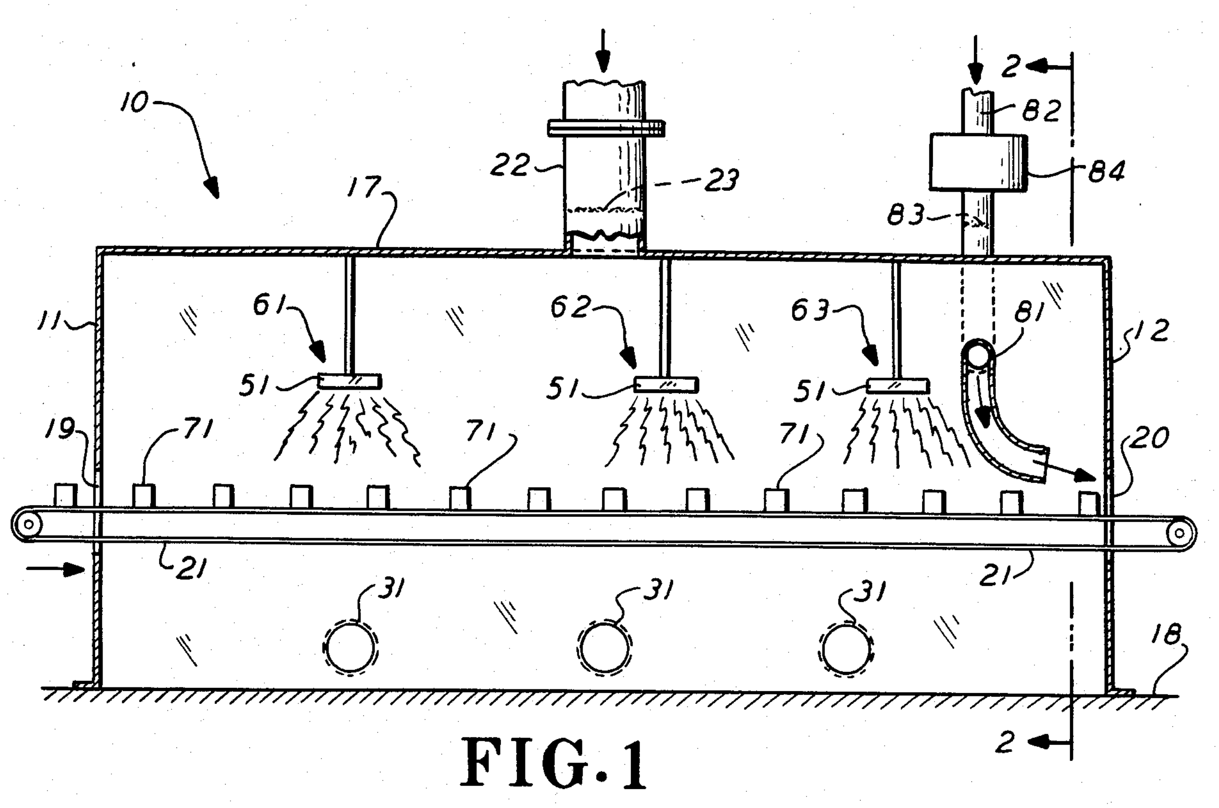
Figure 2:
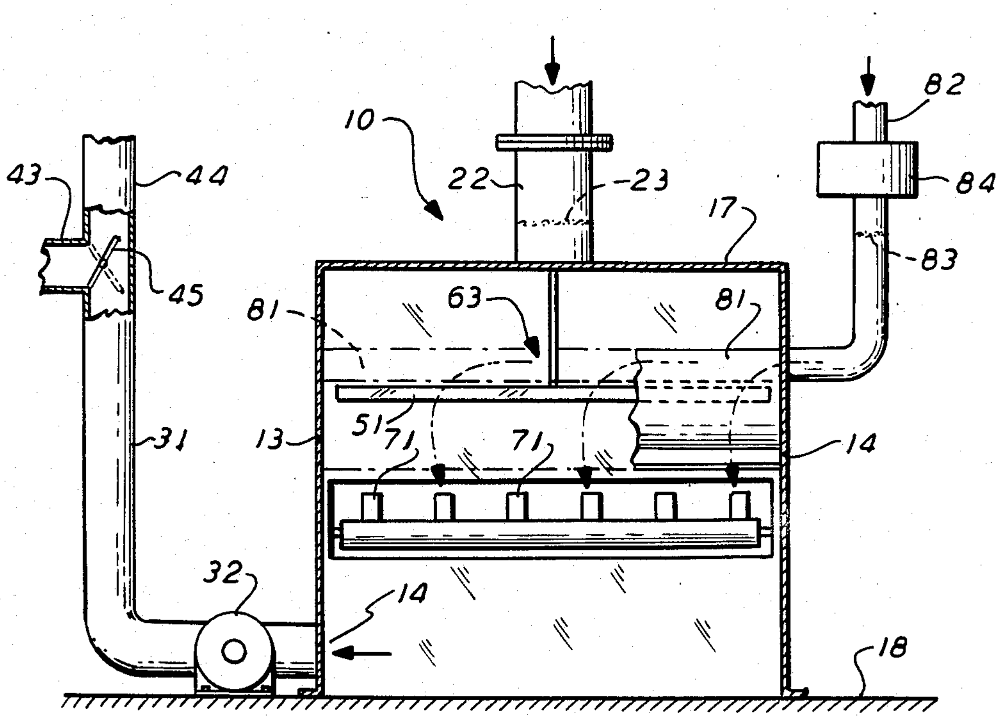

The present invention will be further described with respect to an embodiment thereof illustrated in the accompanying drawings wherein:

FIG. 1 is a side view, in section, of an embodiment of the invention for finishing a solid stick composition in a container; and FIG. 2 is a front view, in section, of the embodiment of FIG. 1.

It is to be understood, however, that the scope of the invention is not limited to the embodiment illustrated in the drawings.

Referring now to the drawings, there is shown in FIGS. 1 and 2 thereof, a protective tunnel, generally designated as 10, which is comprised of opposite end walls 11 and 12, opposite side walls 13 and 14, roof 17 and floor 18. The floor 18 may be a separate part of the tunnel, or the floor of the facility in which the tunnel is placed may function as a floor for the protective tunnel 10. End wall 11 includes an inlet means for containers in the form of inlet slot 19 and end wall 12 includes an outlet means in the form of outlet slot 20.

The interior of protective tunnel 10, above floor 18, is provided with a carrier means for transporting a solid stick composition, in a container, through the protective tunnel 10, in the form of a moveable belt, generally designated as 21. As shown, the carrier means is in the form of a single belt which provides a straight path through the tunnel 10 between inlet 19 and outlet 20. It is to be understood that other arrangements are possible; for example, more than one belt; a plurality of belts to provide a sinuous path through the tunnel. Alternatively, the carrier means can be in the form of rollers instead of a belt.

The protective tunnel 10 is provided with air inlet means for introducing air into the interior of the tunnel, in the form of an air intake in roof 17, whereby air is introduced into the tunnel 10 above belt 21. The air inlet 22 is provided with suitable means for removing particulates from the air, such as, for example, a filter 23. It is to be understood that more than one intake could be employed and that the air intake could be located at a point in the tunnel other than the roof. Moreover, means other than a filter can be employed for cleaning the air introduced into tunnel 10.

The protective tunnel 10 is further provided with air outlet means, in the form of an air outlet duct 31 positioned in the side wall 13 below belt 21, and in fluid flow communication with the interior of tunnel 10. The duct 31 is provided with an air moving means, in the form of a blower or fan 32, which operates to draw air into the interior of tunnel 10 through the air inlet means 22 and cause such air to flow downwardly through the interior of tunnel 10 and into the duct 31 for exhaust therefrom. It is to be understood that more than one air outlet can be employed.

Duct 31 is provided with a pair of outlet means 43 and 44, with the outlet means 43 venting air into the interior of the building in which tunnel 10 is located and outlet means 44 venting air outside of such building. The duct 31 is provided with a suitable control means, such as damper 45 for directing air flow to either outlet 43 or 44, with air preferably being vented to the interior of the building through outlet 43 in the winter months, and to the exterior of the building through outlet 44 in the summer months.

It is to be understood that the air inlet means could be located below the belt and the outlet means above the belt. As a further alternative, the air moving means can be located in the air inlet instead of the air outlet.

The air inlet and air outlet are positioned in the tunnel in a manner such that they are vertically spaced from each other above and below the belt whereby the air circulates past the belt so as to provide the appropriate temperature regulation in the tunnel.

Alternatively, the air inlet and outlet means may both be positioned above or below the belt, with the interior being provided with suitable baffling to direct air past the belt.

It is also to be understood that air could be recirculated through the tunnel, instead of using only ambient air, provided that such recirculated air is suitably conditioned to provide the requisite air inlet temperature. Thus, for example, the system could be provided with appropriate cooling coils to regulate the temperature of the exhausted air prior to reuse thereof.

Similarly, conditioned air could be used instead of ambient air.

The particular air inlet temperature which is selected can vary; however, during operation, the air inlet temperature remains fairly constant, e.g., within 5°-10° F., so as to maintain a substantially constant environmental temperature within tunnel 10.

The interior of tunnel 10 is further provided with various heating means for heating the stick composition in the containers so as to melt the solidified stick, as required, for filling the void produced in the original solidification of the stick, and for polishing the stick, as hereinabove described. The heating means may be in the form of suitable cal-rods 51 suspended above belt 21 so as to provide the required even heating.

It is to be understood that heating means other than cal-rods may be employed, e.g., infra-red lamps.

Each of the cal-rods 51 extends across the width of belt 21 and are arranged over the length of belt 21 so as to provide longitudinally spaced heating stations. As particularly shown, the tunnel 10 includes three heating stations 61, 62 and 63, with the heating station 61 functioning to melt the solid stick so as to fill any void therein, and heating stations 62 and 63 being operated to wet the surface of the stick as part of the polishing operation.

The distance between inlet 19 and heating station 61 is coordinated with the speed of carrier 21 and the environmental temperature in the interior of tunnel 10 so that the stick composition in the container is solidified prior to reaching heating station 61. Similarly, the distance between stations 61 and 62; stations 62 and 63; and station 63 and outlet 20 are coordinated with carrier speed and environmental temperature to be maintained in the tunnel 10 so as to provide for solidification of the stick composition therebetween.

The number of cal-rods at each heating station as well as the distance between the cal-rods and belt are selected in combination with other conditions so as to achieve the controlled heating required for each station. As should be apparent, more heating is required at the initial station 61 which is operated to provide sufficient melting of the stick so as to fill any void therein than is required for the heating stations 62 and 63 which are used in the polishing operation; i.e., to wet the surface of the stick.

Although three heating stations have been shown, it is to be understood that more or less stations could be employed.

The interior of tunnel 10 at the outlet end thereof is provided with means for providing a flow of high velocity air over the stick composition after the final heating station 63 and prior to outlet 20. The air flow is for the purpose of quickly cooling the composition after heating thereof at the final heating station 63.

As particularly shown, the tunnel 10 is provided with an air distributor 81 which extends across the width of the interior of tunnel 10 and which is constructed to direct the air tangentially over the top of the stick formulation within the container. The distributor 81 is provided with an air inlet duct 82 for providing atmospheric air, with the air inlet 82 including a suitable means for removing particulate matter from the air, such as a filter 83 and means for causing air to be drawn through the inlet into the distributor in the form of a blower 84.

It is to be understood that in some cases the additional means for causing a flow of high velocity air over the formulation prior to the outlet may be eliminated, and in other cases, the flow of air out of the tunnel through outlet means 20 has a velocity high enough so that there is no need to provide additional means for creating a high velocity flow of air at the outlet for rapid cooling of the stick formulation after the final heating.

The circulation of filtered air through the protective tunnel provides a clean environment for treatment of the stick composition and also permits environmental temperature within the protective tunnel to be controlled so as to insulate the treatment line from environmental changes. Moreover, a more even cooling of the stick composition is achieved.

In operation, the stick composition or formulation in suitable containers 71 are carried into the interior of tunnel 10 through inlet means 19 by belt 21. Air is drawn into the interior of protective tunnel 10 through air inlet means 22 by fan or blower 42, with the air circulating downwardly through the interior of tunnel 10 to outlet duct 31 wherein the air is withdrawn from the interior of tunnel 10. Such air flow within the protective tunnel 10 provides a uniform atmosphere within the interior of tunnel 10.

The containers are carried through the interior of tunnel 10 and the stick composition is cooled and solidified prior to reaching heating station 61. At heating station 61 the containers pass under cal-rods 51, wherein the stick composition is subjected to controlled heating to remelt the stick composition and fill any void present therein. After heating station 61, the stick composition in the containers 71 which travel on belt 21 between stations 61 and 62 is cooled in the protective tunnel to effect solidification thereof prior to reaching heating station 62.

At heating station 62, the solid stick is again subjected to controlled heating by cal-rods 51 to wet the surface thereof. After heating station 62, the stick composition is again allowed to cool during passage of the containers on belt 21 in protective tunnel 10 between heating stations 62 and 63 to effect solidification thereof. At heating station 63, the solid stick is subjected to controlled heating by cal-rods 51 to wet the surface thereof, followed by cooling during passage between heating station 63 and outlet 20, with the cooling being accelerated by the flow of high velocity air over the stick formulation. The containers 71, including the finished stick composition, are withdrawn from the interior of tunnel 10 through outlet means 20.

The containers 71 may then be capped, marked and packaged, as known in the art.

The conditions employed within the protective tunnel 10 will vary with the particular stick formulation. Thus, the heating means, i.e., the cal-rods, or other source of heat, are controlled in combination with conditions within the tunnel as well as belt speed and distances between heating stations so as to provide for effective remelting, and polishing of the stick composition. The selection of suitable conditions should be within the scope of those skilled in the art from the teachings herein.

Although the invention has been described with respect to a preferred embodiment, it is to be understood that the embodiment may be modified within the spirit and scope of the invention. For example, the interior of the protective tunnel may be divided into separate compartments for effecting the sequential heating and cooling, with each compartment being maintained at a different atmospheric temperature. This modification and others should be apparent to those skilled in the art from the teachings herein.

By proceeding in accordance with the present invention, a solid stick composition can be provided in a suitable container. The use of a closed protective tunnel, as hereinabove described, in the packaging line, insulates the packaging line from environmental changes. Furthermore, the tunnel provides for a cleaner operation which prevents dirtying of sticks in the open containers. In addition, the environmental temperature for the packaging line can be effectively controlled.

These and other advantages should be apparent to those skilled in the art from the teachings herein.

Numerous modifications and variations of the present invention are possible in light of the above teachings, and, therefore, within the scope of the appended claims, the invention may be practiced otherwise than as particularly described.

What is claimed is:

1. A process for treating a solid antiperspirant or deodorant stick composition in a container, comprising:
moving a container including the solid stick composition through a protective tunnel between an inlet and outlet for said tunnel; maintaining said tunnel at a temperature below the melting temperature of the solid stick composition by introducing air into and withdrawing air from the tunnel; effecting controlled localized heating of the solid stick composition at at least two spaced heating stations in the tunnel, said heating being effected to remelt a portion of the solid stick composition only at a heating station; and cooling the stick composition within the tunnel by the circulating air to solidify a liquid portion of the solid stick composition prior to each of said at least two heating stations and prior to the outlet for said tunnel, whereby there is an overall cooling effect in the tunnel and controlled localized heating at the heating stations.

2. The process of claim 1 wherein air is withdrawn from the tunnel at a plurality of points along the length of the tunnel.

3. The process of claim 2 wherein air is conditioned and recirculated through the tunnel.

4. The process of claim 3 wherein the air is conditioned to maintain a substantially constant temperature in the protective tunnel.

* * * * *